UNITED STATES PATENT OFFICE.

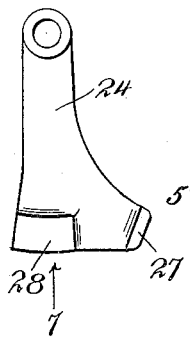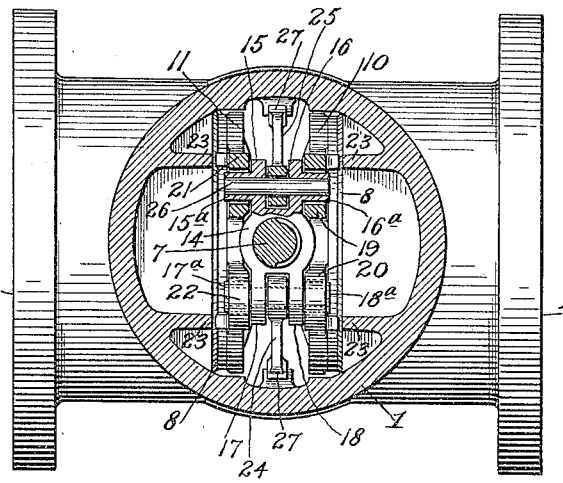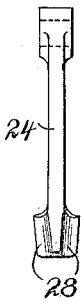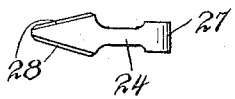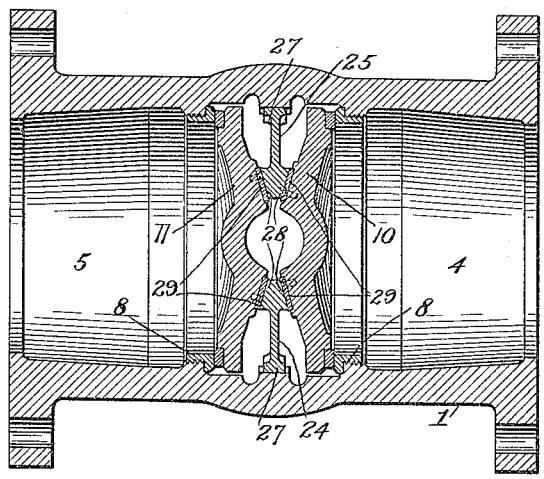

DENIS F. O'BRIEN, OF NEWARK, NEW JERSEY.

GATE-VALVE MECHANISM.

1,181,157.  Specification of Letters Patent.  Patented May 2, 1916.

Application filed July 10, 1911. Serial No. 637,632.

*To all whom it may concern:*

Be it known that I, DENIS F. O'BRIEN, a citizen of the United States, residing at Newark, county of Essex, and State of New Jersey, have invented certain new and useful Improvements in Gate-Valve Mechanism, fully described and represented in the following specification and the accompanying drawings, forming a part of the same.

This invention relates to improvements in gate valve mechanism and particularly controlling mechanism therefor; it being the object of the present invention to provide a gate valve controlling mechanism which in all of its positions relative to the valve or valves will have a broad bearing engagement therewith so as to firmly move the gate valve to and hold it against its seat.

As a full understanding of the improvements of the present invention can best be had from a detailed description of an organization embodying the same, such description will now be given in connection with the accompanying drawings in which—

Figure 1:
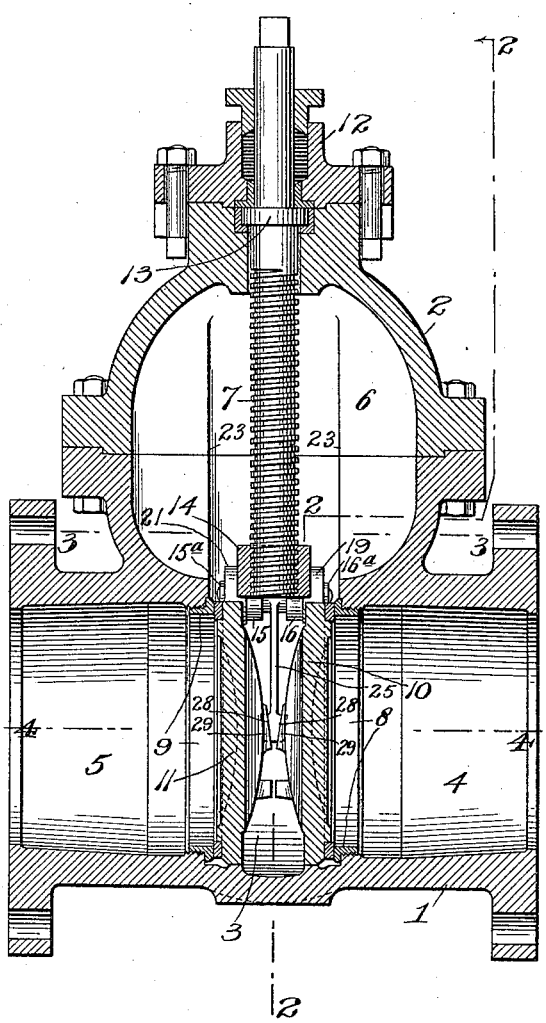
Figure 2:
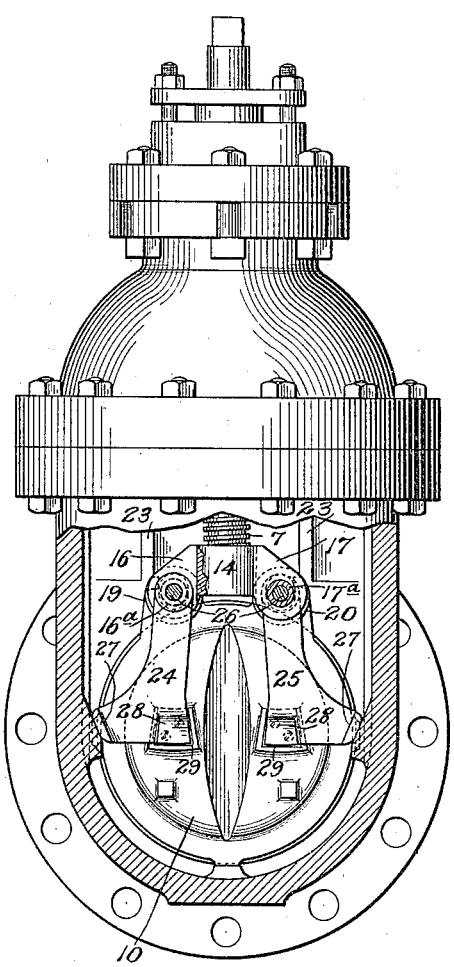

Figure 1 is a vertical elevation of a gate valve mechanism and casing therefor equipped with the present invention. Fig. 2 is a partial vertical section on the line 2 of Fig. 1. Fig. 3 is a horizontal section on the line 3 of Fig. 1. Fig. 4 is a horizontal section on the line 4 of Fig. 1; and Figs. 5, 6 and 7 are details illustrating part of the valve operating mechanism.

Referring to said drawings, the valve casing therein illustrated is made in two parts or castings 1, 2, bolted together, as shown, so as to provide at its lower end a valve chamber 3, provided with an inlet 4 and an outlet 5, communication between which is cut off when the valve is in the position shown in Fig. 1, and an upper chamber 6 in which is mounted an endwise movable spindle 7, which, when rotated, will raise the gate valve more or less from the valve chamber 3 and into the chamber 6, and thus open communication between the inlet and outlet 4, 5. The inlet and outlet 4, 5 have screwed into their inner ends flanged rings 8, 9 providing seats for the valve disks 10, 11, which are provided on their faces adjacent to the valve seats 8, 9 with annular recesses in which are secured annular gaskets of some soft metal or other suitable material for insuring perfect contact between the valves and their seats. The spindle 7 is mounted in the upper member or casting 2, and in a stuffing box 12, bolted to the upper end thereof, the upper squared end of the spindle projecting from stuffing box 12 into convenient position for the reception of a wrench, by which the spindle may be turned. Endwise movement of the spindle is prevented by the provision of a collar 13 thereon fitting in a correspondingly shaped recess provided in the upper end of the casting 2, and the lower end of the stuffing box 12; this recess being suitably packed to prevent leakage around the spindle. At its lower end there is threaded on the spindle 7 a nut 14 which constitutes the carrier for the valve disks 10, 11, and which in order to act as such is provided with two diametrically opposite pairs of lugs 15, 16 and 17, 18, which are, in turn, provided with lateral projections $15^a$, $16^a$ and $17^a$, $18^a$, two of which, $16^a$, $18^a$, enter corresponding openings in ears 19, 20, extending upwardly from and integral with valve disk 10, and the other two of which, $15^a$, $17^a$, enter corresponding openings in like ears 21, 22, projecting upwardly from and integral with valve disk 11. As the spindle is rotated, nut 14, and, therefore, valve disks 10, 11 carried thereby, are caused to travel edgewise upwardly or downwardly, thereon, as the case may be, to open or close communication between the inlet and outlet 4, 5; rotation of said nut, and, therefore, of said valves, being prevented by the valve seats 8, 9, and also by guiding ribs 23, projecting inwardly toward each other in chamber 6 in position to engage the outer faces of the valve disks 10, 11.

From the foregoing it will be understood that as the spindle 7 is rotated in one direction, nut 14 will be caused to travel upwardly on said spindle, and, through the connections just described between the said nut and the valve disks 10, 11, move said valve disks upwardly from the position in which they are shown in Fig. 1 into the chamber 6; and that when the spindle is turned in the opposite direction, the nut and valve disks are moved downwardly toward the position in which they are shown in Fig. 1, the valve disks being guided in both of these movements by their valve seats and also by the guiding ribs 23 just referred to.

In gate valve mechanisms, however, it is necessary to provide not only some valve operating mechanism, such as described, for moving the valve disks bodily edgewise across their valve seats, but also, in order to secure proper closure of the valves, to provide valve closing or controlling mechanism, which, after the valve disks have been thus moved edgewise bodily into alinement with their valve seats, will move the valves endwise or toward their seats and hold them in that position against the pressure of the water or other influences tending to open them, and it is necessary also that such additional valve operating mechanism should be so constructed that the valve disks will be released thereby so that they may be readily moved bodily edgewise by the spindle as just described across the faces of their valve seats.

It is the object of the present invention to provide valve controlling mechanism of this kind which will be more certain and reliable in its operations than valve mechanisms heretofore devised; and such valve controlling mechanism, constituting part of the present invention, will now be described.

This valve controlling mechanism consists of a pair of arms 24, 25, pivotally mounted on two pins 26 driven through the lugs 15, 16 and 17, 18, projecting from the nut 14 so that as said nut is moved upwardly and downwardly, these arms 24, 25 will be moved therewith. These arms are provided with toes 27 coacting with vertically inclined projections 27ª formed on the inner walls of valve chamber 3 in the path of vertical movement of the arms 24, 25, and which tend to engage and force said arms inwardly toward each other as they move downward. At their lower ends, and approximately in line with their pivotal points, each of the arms 24, 25 is provided on opposite sides with inclined members 28 each coacting with a pair of correspondingly inclined projections 29 formed on the inner faces of the valve disks 10, 11, the two pairs of said projections 29 being arranged in line with, but on opposite sides of, the center of the valve disks 10, 11. The inclination on the surface of each of the members 28 is in two directions, that is to say, horizontally outward from the inner edge and also upwardly from its lower edge, as best shown in Figs. 5, 6 and 7, and the inclinations on each of the inclined projections 29 corresponds to that of the inclined member 28 which engages it. The inclinations on each of the members 28 are so formed with relation to the pivotal point, and therefore the swinging movement, of the arm 24 or 25, that in whatever position such arm may assume when swung inwardly by engagement of toe 27 by projection 27ª, such inclined member 28 will always have a broad bearing engagement with its correspondingly inclined pair of opposed projections 29 on the inner face of the valve disk 10 and 11, instead of a mere point or line of contact. The result of this peculiarity in the formation of the inclination is to secure steady, firm movement of the gate valves to their seats, and also a secure seating of the gate valves against any tendency of the water to open them, such broad bearing in the closed position of the gate valves also avoiding any tendency of the gate valve to rock or tilt by reason of the pressure of the water in the main, which might result in leakage.

What I claim is:—

1. A gate valve mechanism comprising the combination, with a pair of valves arranged back to back and movable edgewise across and endwise to and from their seats, of a pair of arms arranged on opposite sides of the valve centers, each arm being pivoted at one end with the other end free, said arms being movable bodily with the valves in their edgewise movements and the free ends of said arms being adapted to swing toward and from each other substantially diametrically of and between the rear faces of the valves, means for so swinging said arms as they move bodily with the valves, two pairs of opposed inclined members on the rear faces of the valves, two correspondingly inclined members on the free end of each arm adapted to engage a corresponding pair of the inclined members on the valves, said inclined members on the valves and said inclined members on the arms being adapted to coact to move the valves to their seats as the arms are swung on their pivots, the inclinations of said inclined members being so related to the pivotal points of the arms that in all valve closing positions of the latter a broad bearing engagement is secured between the inclined members on the arms and those on the valve, substantially as described.

2. A gate valve mechanism comprising the combination, with a pair of valves arranged back to back and movable edgewise across and endwise to and from their seats, of a pair of arms arranged on opposite sides of the valve centers, each arm being pivoted at one end near the valve peripheries with its other end movable substantially diametrically of and between the valves, said arms being movable bodily with the valves in their edgewise movements, means for swinging said arms toward and from each other as they move bodily with the valves, two pairs of opposed inclined members on the rear faces of the valves, two correspondingly inclined members on the free end of each arm adapted to engage a corresponding pair of the inclined members on the valves, said inclined members on the valves and said inclined members on the arms being adapted to coact to move the valves to their seats as the arms are swung on their pivots, the inclinations of said inclined members being so related to the pivotal points of the arms that in all valve closing positions of the latter a broad bearing engagement is secured between the inclined members on the arms and those on the valves, substantially as described.

In testimony whereof, I have hereunto set my hand, in the presence of two subscribing witnesses.

DENIS F. O'BRIEN.

Witnesses:
J. A. GRAVES,
W. H. KENNEDY.

Copies of this patent may be obtained for five cents each, by addressing the "Commissioner of Patents, Washington, D. C."